United States Patent [19]

Sugio et al.

[11] 4,448,931

[45] May 15, 1984

[54] POLYPHENYLENE ETHER RESIN

[75] Inventors: Akitoshi Sugio, Ohmiya; Masanobu Masu; Akikazu Amagai, both of Tokyo, all of Japan

[73] Assignee: Mitsubishi Gas Chemical Company, Inc., Tokyo, Japan

[21] Appl. No.: 369,109

[22] Filed: Apr. 16, 1982

[30] Foreign Application Priority Data

Apr. 21, 1981 [JP] Japan ................................. 56-60417

[51] Int. Cl.$^3$ .............................................. C08L 61/04
[52] U.S. Cl. ..................................... 525/68; 525/151; 525/152; 525/905
[58] Field of Search ................. 525/68, 905, 152, 151

[56] References Cited

U.S. PATENT DOCUMENTS 4,128,602 12/1978 Katchman et al. ................... 525/68

Primary Examiner—J. Ziegler
Attorney, Agent, or Firm—Wenderoth, Lind & Ponack

[57] ABSTRACT

A resin composition comprising a polyphenylene ether resin and a rubber-modified polystyrene resin, wherein at least 80% of the rubber particles based on the total number of rubber particles in the elastomeric phase of the rubber-modified polystyrene resin have a particle diameter in the range of 0.5 to 4 microns, and the elastomeric phase has a particle size distribution index, SDI, defined by the equation $$SDI = \frac{\Sigma(nx^3)/\Sigma(nx^2)}{\Sigma(nx)/\Sigma n}$$

wherein x is the diameter in microns of the particles, and n is the number of particles having a particle diameter of x microns, of not more than 1.9.

12 Claims, No Drawings

POLYPHENYLENE ETHER RESIN

This invention relates to a polyphenylene ether resin composition, and more specifically, to a polyphenylene ether resin composition having excellent impact resistance comprising a polyphenylene ether resin and a rubber-modified polystyrene resin.

Polyphenylene ether resins have excellent heat resistance and mechanical properties, but poor processability and impact strength.

U.S. Pat. No. 3,383,435 teaches a resin composition prepared by mixing a polyphenylene ether resin with a polystyrene resin or a rubber-modified polystyrene resin for the purpose of improving the processability of the polyphenylene ether resin.

U.S. Pat. No. 4,128,602 discloses a high impact thermoplastic composition comprising a polyphenylene ether, a polystyrene resin and rubber, and having a dispersed particulate rubber phase wherein the dispersed particles have a maximum mean diameter of about 2 microns. The patent is quite silent on the particle size distribution of the dispersed particles.

It is well known to those skilled in the art that the impact strength of a rubber-modified polystyrene resin depends greatly upon the distributed state of rubber particles constituting the elastomeric phase. For example, M. R. Grancio states in Polymer Eng. Sci., 12, 213 (1972) that the optimum distributed state of rubber particles in a rubber-modified polystyrene resin is a broadly distributed state in which rubber particles of different diameters within a wide range can be present. British Patent Specification No. 1,174,214 teaches a rubber-modified polystyrene resin having an elastomeric phase in which the dispersed rubber particles are broadly distributed and consist of a group of small particles having a diameter of from 1 to 3 microns and a group of large particles having a diameter of from 5 to 25 microns, pointing out that this is an optimum distributed state.

It seems from a comparison of the two above-cited prior art references regarding the particle size of the rubber-modified polystyrene resin, with the above-cited U.S. Pat. No. 4,128,602, that the optimum particle diameter of rubber particles used to improve impact strength differs substantially between the rubber-modified polystyrene resin when used alone, and when used in a polyphenylene ether resin composition.

We examined the particle diameters and particle size distributions of various rubber-modified polystyrene resins having excellent impact strength, and found that 20 to 70% of the total number of the rubber particles have a size in the range of 0.5 to 4 microns, and that the rubber particles have a particle size distribution index of 2 to 10. However, our investigations have led to the discovery that when such rubber particles having a particle diameter and a particle size distribution index within these ranges are incorporated in a polyphenylene ether resin, the resultant composition does not have fully satisfactory impact strength.

It is an object of this invention to provide a polyphenylene ether resin composition having excellent impact strength.

Another object of this invention is to provide a polyphenylene ether resin composition containing rubber particles with such a particle diameter and a particle size distribution that the relation of these to impact strength quite differs from that in a rubber-modified polystyrene resin which can be anticipated from the prior art or has been confirmed by the present inventors.

Still another object of this invention is to provide a polyphenylene ether resin composition having excellent impact strength comprising a polyphenylene ether resin and a rubber-modified polystyrene resin, in which a greater part of the rubber particles consists of particles having a relatively small particle diameter and the particle size distribution of the rubber particles is narrow.

The above objects and advantages of the invention are achieved by a resin composition comprising a polyphenylene ether resin and a rubber-modified polystyrene resin, wherein at least 80% of the rubber particles based on the total number of rubber particles in the elastomeric phase of the rubber-modified polystyrene resin have a particle diameter in the range of 0.5 to 4 microns, and the elastomeric phase has a particle size distribution index, SDI, defined by the following equation with regard to the entire rubber particles, of not more than 1.9:

$$SDI = \frac{\Sigma(nx^3)/\Sigma(nx^2)}{\Sigma(nx)/\Sigma n} \tag{I}$$

wherein x is the diameter in microns of the particles, and n is the number of particles having a particle diameter of x microns.

In equation (I) above, the numerator on the right side is a particle diameter called a mean volume surface diameter, the denominator is the particle diameter called an arithmetic mean diameter, and $\Sigma$ is a symbol showing the total sum.

The particle diameter (x) in equation (I) can be obtained by observing the rubber particles under an electron microscope having a magnification of, for example, 7000 either visually or through photography, and measuring the long diameters of the individual particles. The rubber particles observed under an electron microscope are generally elliptical and their long and short diameters can be measured. In the present specification, therefore, the particle diameter of a rubber particle denotes its long diameter. Usually, the number (n) of particles to be measured may be within the range of 100 to 150.

Preferred rubber-modified polystyrene resins for use in the resin composition of this invention include, for example, two-phase system resins comprising a polystyrene matrix and rubber dispersed therein, and interpolymers of a styrene monomer with rubbers.

Preferably, the two-phase system resin is composed of a homopolymer or copolymer containing at least 25% by weight of a structural unit of the formula

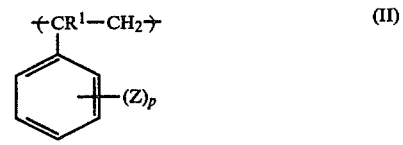

wherein $R^1$ represents a hydrogen atom or a lower alkyl group, Z represents a halogen atom or a lower alkyl group, and p is 0 or an integer of 1 to 5, as a polystyrene resin, and rubber. It can be prepared by mechanically mixing the polystyrene resin and rubber.

In formula (II), the lower alkyl group for $R^1$ is preferably a $C_1$-$C_3$ alkyl group such as methyl, ethyl and propyl. Preferred examples of the lower alkyl group for Z may be the same as those exemplified with regard to $R^1$. Preferred halogen atoms for Z are chloro and bromo.

The polystyrene resin of formula (II) can be produced by polymerizing a styrene monomer of the formula

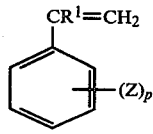

(II)' wherein $R^1$, Z and p are as defined above, or a mixture of it with another vinyl monomer by a method known per se.

The styrene monomer of formula (II)' itself is known, and includes, for example, styrene, α-methylstyrene and chlorostyrene. Examples of preferred other vinyl monomers to be copolymerized with the styrene monomer are acrylonitrile and maleic anhydride.

Examples of preferred polystyrene resins are homopolymers or copolymers of the styrene monomer of formula (II)', such as polystyrene, poly(α-methylstyrene), polychlorostyrene and poly(styrene-α-methylstyrene), and copolymers of the styrene monomer of formula (II)' with another vinyl monomer such as acrylonitrile.

The polystyrene resins have a number average molecular weight of preferably at least 30,000, especially preferably 50,000 to 200,000.

The interpolymer of the styrene monomer and rubber is preferably produced by copolymerizing the styrene monomer of formula (II)' with rubber. Such an interpolymer is also known per se, and industrially, it is usually produced by graft-copolymerizing the styrene monomer with rubber or an elastomer by methods known per se.

The rubber may be any natural or synthetic rubbers which are known for preparing rubber-modified polystyrene resins and are substantially elastic at room temperature. The synthetic rubbers include, for example, diene-type rubbers, copolymers, of diene monomers and styrene monomers, and monovinyl-type rubbers. Examples of preferred synthetic rubbers are polybutadiene, polyisoprene, SBR (styrene-butadiene rubber), styrene-butadiene block copolymer, ethylene-propylene rubber and EPOM (elastomers from ethylene, propylene and unconjugated diene monomers).

Preferred polyphenylene ether resins to be used for the resin composition of this invention are homopolymers and copolymers having a structural unit expressed by the following formula

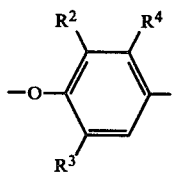

(III)

wherein $R^2$ and $R^3$ represent an alkyl group having 1 to 3 carbon atoms, and $R^4$ represents a hydrogen atom or an alkyl group having 1 to 3 carbon atoms. The polyphenylene ether resin having a structural unit of formula (III) can be produced by polymerizing at least one monocyclic phenol of the formula

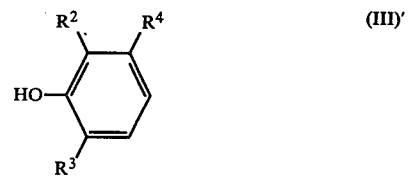

(III)' wherein $R^2$, $R^3$ and $R^4$ are as defined above, in accordance with methods known per se.

The alkyl groups having 1 to 3 carbon atoms for $R^2$, $R^3$ and $R^4$ in formulae (III) and (III)' are methyl, ethyl, n-propyl and iso-propyl groups.

Examples of preferred monocyclic phenols of formula (III)' include:
2,6-dimethylphenol,
2,6-diethylphenol,
2,6-dipropylphenol,
2-methyl-6-ethylphenol,
2-methyl-6-propylphenol,
2-ethyl-6-propylphenol,
m-cresol,
2,3-dimethylphenol,
2,3-diethylphenol,
2,3-dipropylphenol,
2-methyl-3-ethylphenol,
2-methyl-3-propylphenol,
2-ethyl-3-methylphenol,
2-ethyl-3-propylphenol,
2-propyl-3-methylphenol,
2-propyl-3-ethylphenol,
2,3,6-trimethylphenol,
2,3,6-triethylphenol,
2,3,6-tripropylphenol,
2,6-dimethyl-3-ethylphenol, and
2,6-dimethyl-3-propylphenol.

Specific examples of the polyphenylene ether resin of formula (III) include:
poly(2,6-dimethyl-1,4-phenylene)ether,
poly(2,6-diethyl-1,4-phenylene)ether,
poly(2,6-dipropyl-1,4-phenylene)ether,
poly(2-methyl-6-ethyl-1,4-phenylene)ether,
poly(2-methyl-6-propyl-1,4-phenylene)ether,
poly(2-ethyl-6-propyl-1,4-phenylene)ether,
2,6-dimethylphenol/2,3,6-trimethylphenol copolymer (denoting a polyphenylene ether copolymer derived from 2,6-dimethylphenol and 2,3,6-trimethylphenol; the same way of expressing the copolymers is applicable hereinafter),
2,6-dimethylphenol/2,3,6-triethylphenol copolymer,
2,6-diethylphenol/2,3,6-trimethylphenol copolymer, and
2,6-dipropylphenol/2,3,6-trimethylphenol copolymer.

These polyphenylene ether resins contain at least about 50, preferably at least about 80, structural units of formula (III).

The resin composition of this invention contains an elastomeric phase of a rubber-modified polystyrene resin because it comprises the polyphenylene ether resin and the rubber-modified polystyrene resin. The elastomeric phase is composed of rubber particles at least 80%, preferably at least 90%, of which have a particle diameter in the range of 0.5 to 4 microns, and these rubber particles have a particle size distribution index, as hereinabove defined, of not more than 1.9, preferably not more than 1.5.

The polyphenylene ether resin composition of this invention can be prepared by methods known per se. For example, it is prepared by mechanically mixing the polyphenylene ether resin and the rubber-modified polystyrene resin by means of an extruder or the like.

The particle diameter of the rubber particles forming the elastomeric phase of the resin composition of this invention can be controlled (reduced) to some extent during the mechanical mixing. However, the particle size distribution index of the rubber particles cannot be controlled to a lower value by mixing because it generally tends to increase by the mixing operation. It should be understood therefore that an elastomeric phase composed of rubber particles having a particle size distribution index of not more than 1.9 is produced by using a rubber-modified polystyrene resin containing rubber particles having a particle size distribution index of not more than 1.9.

The resin composition of this invention contains preferably 10 to 90% by weight, especially preferably 25 to 75% by weight, of the polyphenylene ether resin based on the total weight of the polyphenylene ether resin and the rubber-modified polystyrene resin.

As required, the resin composition of this invention may include various other resins and elastomers, various additives, fillers, etc.

Examples of preferred resins or elastomers or rubbers are the polystyrene resins or rubbers exemplified hereinabove.

The additives include pigments such as titanium dioxide, hindered phenol-type antioxidants such as 2,6-di-tert-butyl-p-cresol and flame retardants such as triaryl phosphates. The fillers include, for example, reinforcing agents such as glass filaments or fibers and asbestos.

The resin composition of this invention has an elastomeric phase composed of rubber particles having a particle diameter and a particle size distribution index within the specified ranges, and differs from conventional polyphenylene ether resin compositions in which the rubber particles are limited only in regard to their diameter.

The resin composition of the invention exhibits very high impact strength as shown in the following working examples, which illustrate the resin composition more specifically.

Unless otherwise specified, all the compositions given in the examples were prepared in pellet form by mixing the polyphenylene ether resin, the rubber-modified polystyrene resin and other ingredients such as another elastomer, additives, etc. by means of a twin-screw extruder at 220° to 290° C. The properties of the compositions were measured by using samples prepared by molding the resulting pellets by means of a usual injection molding machine.

EXAMPLE 1

A mixture of the following ingredients was kneaded and pelletized by a twin-screw extruder.

| | | |
|---|---|---|
| (1) | 2,6-Dimethylphenol/2,3,6-trimethyl phenol copolymer (containing 5 mole % of 2,3,6-trimethylphenol) having an intrinsic viscosity, measured at 25° C. in chloroform as a solvent, of 0.53 dl/g | 50 parts by weight |
| (2) | Rubber-modified polystyrene containing a polystyrene matrix with an intrinsic viscosity, measured at 25° C. in chloroform as a solvent, of 0.85 dl/g and a polybutadiene content of 5.5% by weight in which 100% of the rubber particles had a diameter in the range of 0.5 to 4 microns and the particle size distribution index of the rubber particles was 1.2 (GH7100, manufactured by Dainippon Ink and Chemicals, Inc.) | 46 parts by weight |
| (3) | Polystyrene-polybutadiene-polystyrene block copolymer (the weight ratio of the polystyrene portion and the polybutadiene portion 30:70) | 3 parts by weight |
| (4) | Ethylene-propylene copolymer having a reduced specific viscosity, determined at 25° C. in decalin as a solvent, of 2 (0.1 g/100 ml) | 1 part by weight |
| (5) | Triphenyl phosphate | 18 parts by weight |
| (6) | Titanium dioxide | 5 parts by weight |
| (7) | 2,6-Di-tert-butyl-p-cresol | 0.6 part by weight |

The resulting pellets were molded into test samples, and their notched Izod impact strengths were measured. The results are shown in Table 1.

COMPARATIVE EXAMPLE 1

Pellets were produced by using the same ingredients and the same method as in Example 1 except that the rubber-modified polystyrene was changed to a rubber-modified polystyrene resin (HT-50, manufactured by Idemitsu Petrochemical Co., Ltd.) containing a polystyrene matrix with an intrinsic viscosity, measured at 25° C. in chloroform as a solvent, of 0.80 dl/g, and having a polybutadiene content of 5.5% by weight, in which 23% of the entire rubber particles had a particle diameter in the range of 0.5 to 4 microns and the rubber particles had a particle size distribution index of 5.3. Test samples were molded from the pellets, and their notched Izod impact strengths were measured. The results are also shown in Table 1.

COMPARATIVE EXAMPLE 2

Pellets were produced by using the same ingredients and the same method as in Example 1 except that the rubber-modified polystyrene was changed to a rubber-modified polystyrene resin ("Diarex HT-91", manufactured by Mitsubishi Monsanto Chemical Co., Ltd.) containing a polystyrene matrix with an intrinsic viscosity, measured at 25° C. in chloroform, of 0.84 dl/g and having a polybutadiene content of 5.4% by weight, in which 78% of the rubber particles had a diameter in the range of 0.5 to 4 microns and the rubber particles had a particle size distribution index of 2.0. The pellets were molded into samples, and their notched Izod impact strengths were measured. The results are shown in Table 1.

TABLE 1

| | Notched Izod impact strength (kg · cm/cm) | |
|---|---|---|
| | ⅛ inch thick | ¼ inch thick |
| Example 1 | 38.0 | 29.0 |
| Comparative Example 1 | 29.0 | 14.0 |
| Comparative | 29.0 | 13.5 |

TABLE 1-continued

| | Notched Izod impact strength (kg · cm/cm) | |
|---|---|---|
| | ⅛ inch thick | ¼ inch thick |
| Example 2 | | |

EXAMPLE 2

A mixture of the following ingredients was kneaded and pelletized by a twin-screw extruder.

| (1) | Poly(2,6-dimethylphenylene)ether having an intrinsic viscosity, measured at 25° C. in chloroform as a solvent, of 0.51 dl/g | 40 parts by weight |
|---|---|---|
| (2) | Same rubber-modified polystyrene as used in Example 1 | 56 parts by weight |
| (3) | Same polystyrene-polybutadiene-polystyrene block copolymer as used in Example 1 | 3 parts by weight |
| (4) | Same ethylene-propylene copolymer as used in Example 1 | 1 part by weight |
| (5) | Titanium dioxide | 7 parts by weight |
| (6) | 2,6-Di-tert-butyl-p-cresol | 0.6 part by weight |

The pellets were molded to form a test sample, and its Izod impact strength was measured. The results are shown in Table 2.

COMPARATIVE EXAMPLE 3

Pellets were formed by using the same ingredients and the same method as in Example 2 except that the rubber-modified polystyrene resin was changed to the same rubber-modified polystyrene resin as used in Comparative Example 2. A test sample was prepared from the pellets and its notched Izod impact strength was measured. The results are shown in Table 2.

TABLE 2

| | Notched Izod impact strength (kg · cm/cm) |
|---|---|
| Example 2 | 20.0 (⅛ inch thick) |
| Comparative Example 3 | 14.0 (⅛ inch thick) |

EXAMPLE 3

A mixture of the following ingredients was kneaded and pelletized by a twin-screw extruder.

| (1) | 2,6-Dimethylphenol/2,3,6-trimethylphenol copolymer (the 2,3,6-trimethylphenol content 5 mole %) having an intrinsic viscosity, measured at 25° C. in chloroform as a solvent, of 0.54 dl/g | 43 parts by weight |
|---|---|---|
| (2) | Rubber-modified polystyrene resin (Dylene 989, a tradename for a product of Arco Chemicals) containing a polystyrene matrix with an intrinsic viscosity, measured at 25° C. in chloroform as a solvent, of 0.86 dl/g and having a polybutadiene content of 5.2% by weight, in which 97% of the entire rubber particles had a diameter in the range of 0.5 to 4 microns and the rubber particles had a particle size distribution index of 1.6 | 55 parts by weight |
| (3) | Same polystyrene-polybutadiene-polystyrene block copolymer as in Example 1 | 2 parts by weight |
| (4) | Triphenyl phosphate | 8 parts by weight |
| (5) | Titanium dioxide | 7 parts by weight |
| (6) | 2,6-Di-tert-butyl-p-cresol | 0.6 part by weight |

A test sample was molded from the pellets, and its notched Izod impact strength was measured. The results are shown in Table 3.

COMPARATIVE EXAMPLE 4

The same procedure as in Example 3 was repeated except that the rubber-modified polystyrene resin was changed to the same rubber-modified polystyrene as used in Comparative Example 1. The results are shown in Table 3.

TABLE 3

| | Notched Izod impact strength (kg · cm/cm) |
|---|---|
| Example 3 | 20.0 (⅛ inch thick) |
| Comparative Example 4 | 13.0 (⅛ inch thick) |

What we claim is:

1. A resin composition comprising a polyphenylene ether resin and a rubber-modified polystyrene resin, wherein at least 80% of the rubber particles based on the total number of rubber particles in the elastomeric phase of the rubber-modified polystyrene resin have a particle diameter in the range of 0.5 to 4 microns, and the elastomeric phase has a particle size distribution index, SDI, defined by the equation $$SDI = \frac{\Sigma(nx^3)/\Sigma(nx^2)}{\Sigma(nx)/\Sigma n}$$

wherein x is the diameter in microns of the particles, and n is the number of particles having a particle diameter of x microns, of not more than 1.9.

2. The composition of claim 1 wherein at least 90% of the rubber particles in the elastomeric phase have a diameter in the range of 0.5 to 4 microns.

3. The composition of claim 2 wherein the elastomeric phase has a particle size distribution index of not more than 1.5.

4. The resin composition of claim 1 wherein the rubber-modified polystyrene resin is a two-phase system resin composed of a polystyrene resin matrix and rubber dispersed therein.

5. The resin composition of claim 1 wherein the polystyrene resin is a homopolymer or copolymer containing at least 25% by weight of structural units of the formula

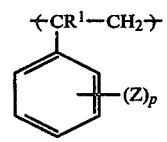

wherein $R^1$ represents a hydrogen atom or a lower alkyl group, Z represents a halogen atom or a lower alkyl group, and p is 0 or an integer of 1 to 5.

6. The resin composition of claim 1 wherein the rubber-modified polystyrene resin is an interpolymer of a styrene monomer of the formula

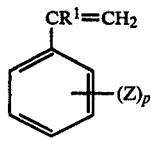

wherein $R^1$ represents a hydrogen atom or a lower alkyl group, Z represents a halogen atom or a lower alkyl group, and p is 0 or an integer of 1 to 5, with rubber.

7. The resin composition of claim 6 wherein the rubber is natural rubber or a synthetic rubber.

8. The resin composition of claim 6 wherein the synthetic rubber is a diene-type rubber, a copolymer of a diene monomer and a styrene monomer, or a monovinyl-type rubber.

9. The resin composition of claim 1 wherein the polyphenylene ether resin is a homopolymer or copolymer having at least 50 structural units represented by the formula

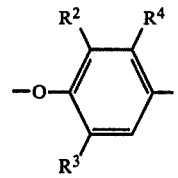

wherein $R^2$ and $R^3$ represent an alkyl group having 1 to 3 carbon atoms, and $R^4$ represents a hydrogen atom or an alkyl group having 1 to 3 carbon atoms.

10. The resin composition of any one of claims 1 to 9 wherein the proportion of the polyphenylene ether resin is 10 to 90% by weight based on the total weight of the polyphenylene ether resin and the rubber-modified polystyrene resin.

11. The resin composition of claim 1 wherein the proportion of the polyphenylene ether resin is 25 to 75% by weight based on the total weight of the polyphenylene ether resin and the rubber-modified polystyrene resin.

12. The composition of claim 1 wherein the elastomeric phase has a particle size distribution index of not more than 1.5.

* * * * *